United States Patent [19]
Kirchberger

[11] 3,813,024
[45] May 28, 1974

[54] BATTERY ASSEMBLY MACHINE
[75] Inventor: Walter Carl Kirchberger, Menomonee Falls, Wis.
[73] Assignee: Globe-Union Inc., Milwaukee, Wis.
[22] Filed: June 25, 1973
[21] Appl. No.: 375,247

Related U.S. Application Data
[63] Continuation of Ser. No. 192,964, Oct. 27, 1971, abandoned.

[52] U.S. Cl............................ 228/58, 29/2, 29/204
[51] Int. Cl............................................... B23k 1/12
[58] Field of Search .................. 29/2, 204; 136/175; 228/58; 214/6

[56] References Cited
UNITED STATES PATENTS

| | | | |
|---|---|---|---|
| 1,358,869 | 11/1920 | Norris | 228/45 X |
| 2,324,523 | 7/1943 | Lund | 29/204 |
| 2,704,593 | 3/1955 | Galloway | 29/204 X |
| 2,786,433 | 3/1957 | Vieth | 228/58 X |
| 3,061,913 | 11/1962 | Schenk, Jr. | 29/204 |
| 3,604,094 | 9/1971 | Farmer | 29/204 |

Primary Examiner—J. Spencer Overholser
Assistant Examiner—Robert J. Craig
Attorney, Agent, or Firm—John Phillip Ryan; Neil E. Hamilton

[57] ABSTRACT

A multistationed battery assembly machine which affords a simultaneous three station operation. At the first station, battery plates and separators are positioned with the lugs extending in an upright position and after initial assembly, the entire unit is rotated to a second station where the unit is raised and the lugs orientated into position by means of comb members. At the burning station, the lugs are melted to form straps and connected to posts whereupon the unit is dropped out of position and moved to a third unloading station. The multistationed assembly machine offers a box assembly at the loading station which can be easily adjusted to receive plates of varying numbers and length. Another unique feature of the box assembly is its pivoting to the assembly machine at opposite corners so as to afford a compound angle which facilitates easy loading.

11 Claims, 13 Drawing Figures

INVENTOR.
WALTER C. KIRCHBERGER
BY
Neil E. Hamilton
ATTORNEY.

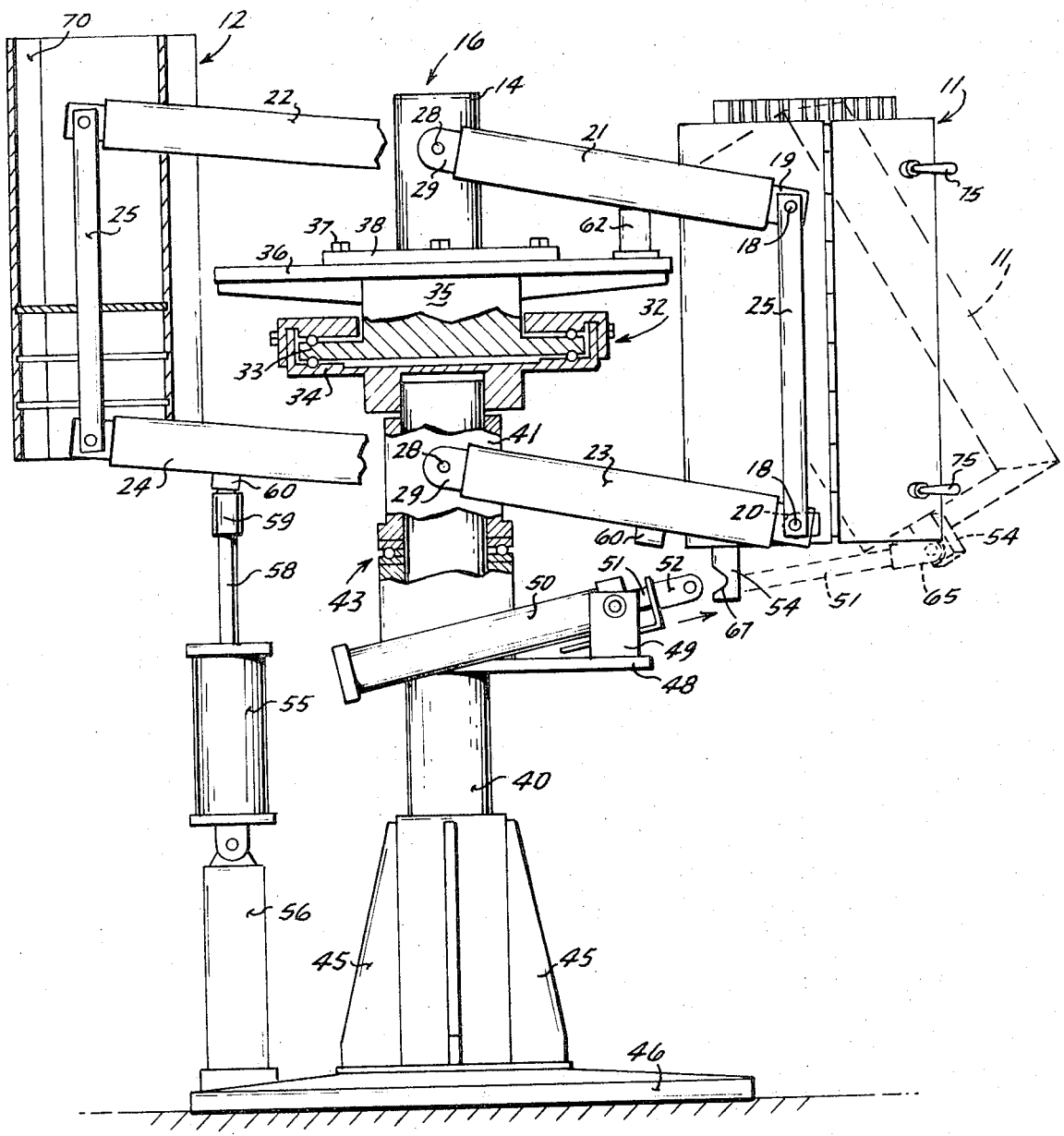

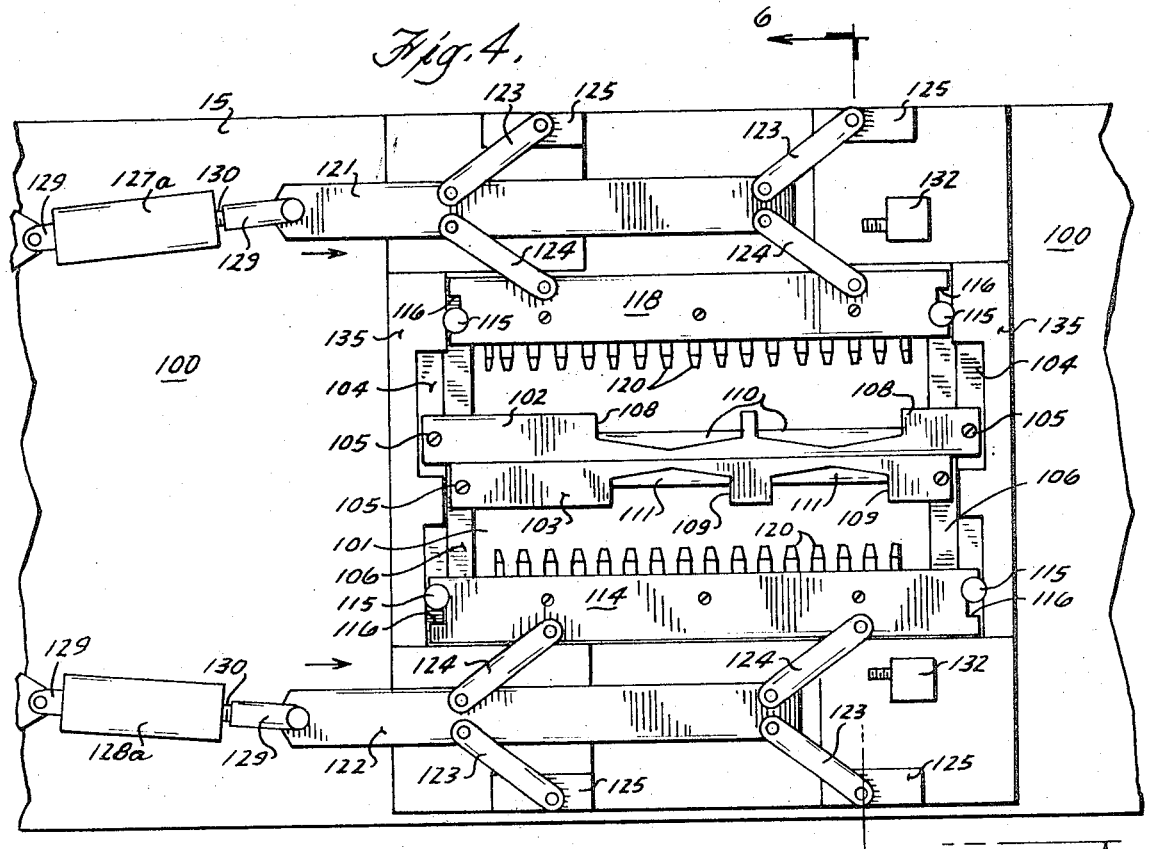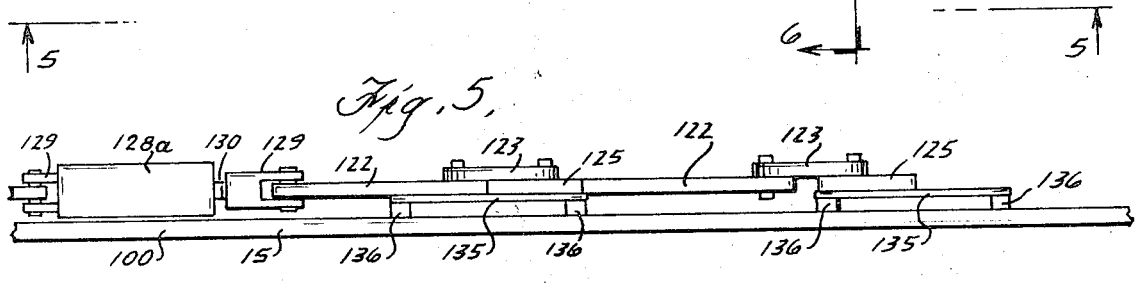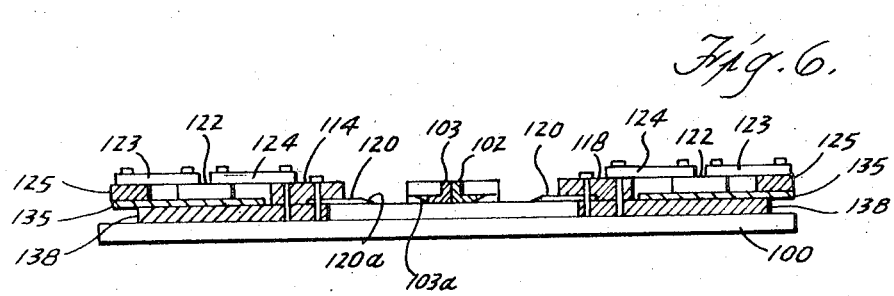

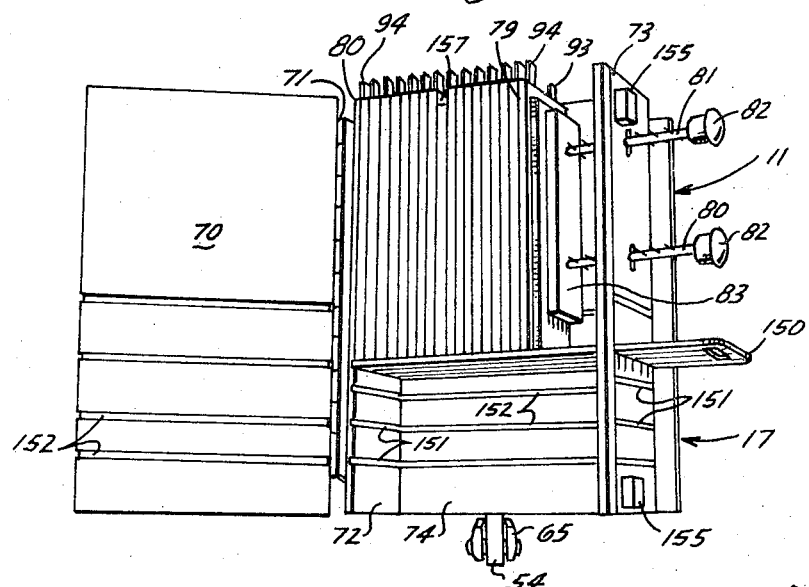
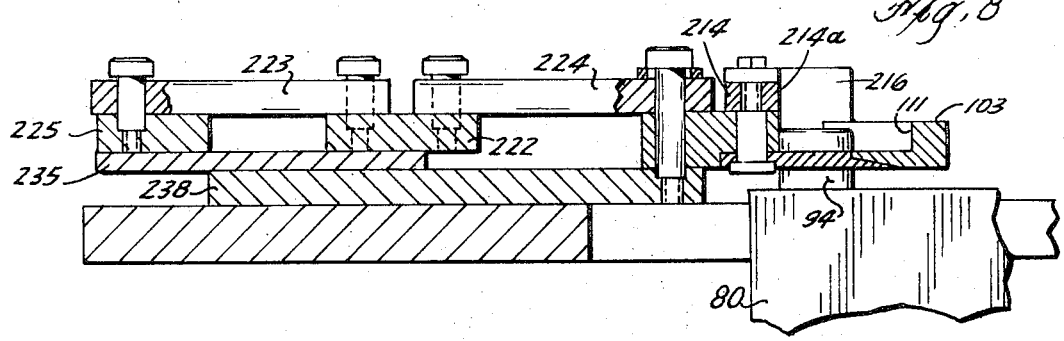
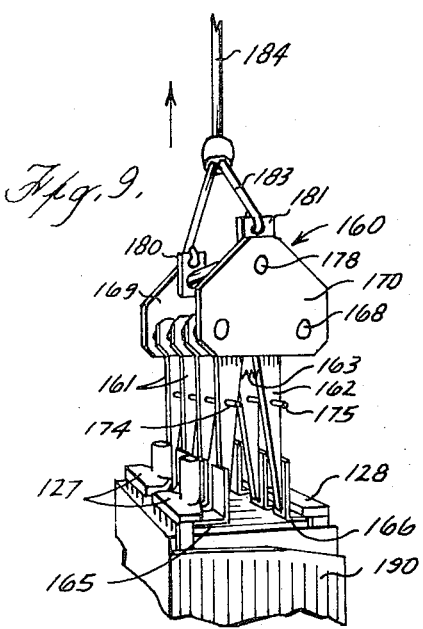
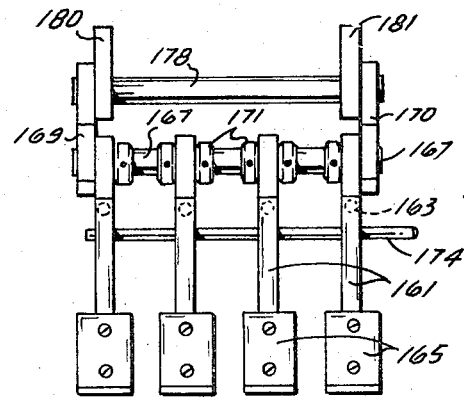

INVENTOR.
WALTER C. KIRCHBERGER
BY
Neil E. Hamilton
ATTORNEY.

BATTERY ASSEMBLY MACHINE

This is a continuation of application Ser. No. 192,964 filed Oct. 27, 1971, now abandoned.

BACKGROUND OF THE INVENTION

This invention relates to an assembly machine for burning battery cells and more particularly, to a three station assembly machine wherein the loading, burning and unloading operations are simultaneously afforded.

Battery assembly machines of the type concerned with in this invention are known to employ a first load station where the plates and insulators are positioned and a burning station or position where the lugs on the cells are burned together into straps. There is currently available a multistationed assembly machine as described in U.S. Pat. No. 3,604,094. However, there is not known a burning machine for burning battery cell units wherein the three operations of loading, burning, and unloading can be carried out simultaneously. Neither is there known in the prior art an assembly machine for composing battery cell units wherein a loading station is readily adjustable to receive plates of varying size and number in a loading assembly box which also is mounted in such a manner that maximum access and ease of placement of the cells in the box can be effected. Of the type of machines concerned with in this invention which are currently on the market, none affords the advantage of having a pinned index or orientation means to assure that the preassembled lugs are in substantial alignment prior to their engagement with the comb members.

It is an object of the present invention to provide a novel assembly machine for battery cell units which affords a simultaneous loading, burning of the cell units and unloading at three separate positions. It is another object of this invention to provide an assembly box for the plates and insulators which affords maximum access and positive placement of the plates in the box. It is still another object of the present invention to provide an assembly machine for burning battery cell units wherein maximum indexing is afforded for the preassembled plates during the burning operation. It is yet another object of the invention to provide a multistationed assembly machine for industrial batter cell units wherein ease of operation is afforded and high production rates obtained.

SUMMARY OF THE INVENTION

The foregoing objects are accomplished and the shortcomings of the prior art are overcome by the present multistationed assembly machine which comprises an independent load station, a burning station and an unloading station. At the loading station, a readily accessible assembly box or positioning means which is adapted to positively receive various sizes and numbers of plates is provided which, after loading, is moved to the second burning station. Prior to the burning operation, positioning of the assembly is assured by an orientation means. After burning the lugs into straps for each cell unit, the assembly is then rotated to an unloading station where the burned straps are gripped by a lifting mechanism and the burned cell unit lifted from or lowered through the assembly box and into a cell casing.

BRIEF DESCRIPTION OF DRAWING

A better understanding of the present battery assembly machine will be accomplished by reference to the drawing wherein:

FIG. 3 is a view in side elevation of the assembly machine shown in FIG. 1 with the assembly boxes being moved outwardly for loading in one instance and upwardly in another for burning.

FIG. 4 is a top plan view showing the intermediate or burning stage of the assembly machine which in this figure is shown in an open position whereas in FIG. 1, it is closed.

FIG. 5 is a view in vertical section taken along line 5—5 of FIG. 4 and illustrating the actuation linkage of the burning assembly station.

FIG. 6 is a view in vertical section taken along line 6—6 of FIG. 4 and also illustrating the linkage mechanism at the burning station.

FIG. 7 is a perspective view illustrating the placing of cell plates into an assembly box for later burning into battery cell units.

FIG. 8 is a view similar to FIG. 6 but showing a slightly modified alternative construction.

FIG. 9 is a perspective view of the lifting means engaging a formed cell unit.

FIG. 10 is a view in side elevation showing the lifting mechanism in FIG. 9.

DESCRIPTION OF THE PREFERRED EMBODIMENT

Figure 1:
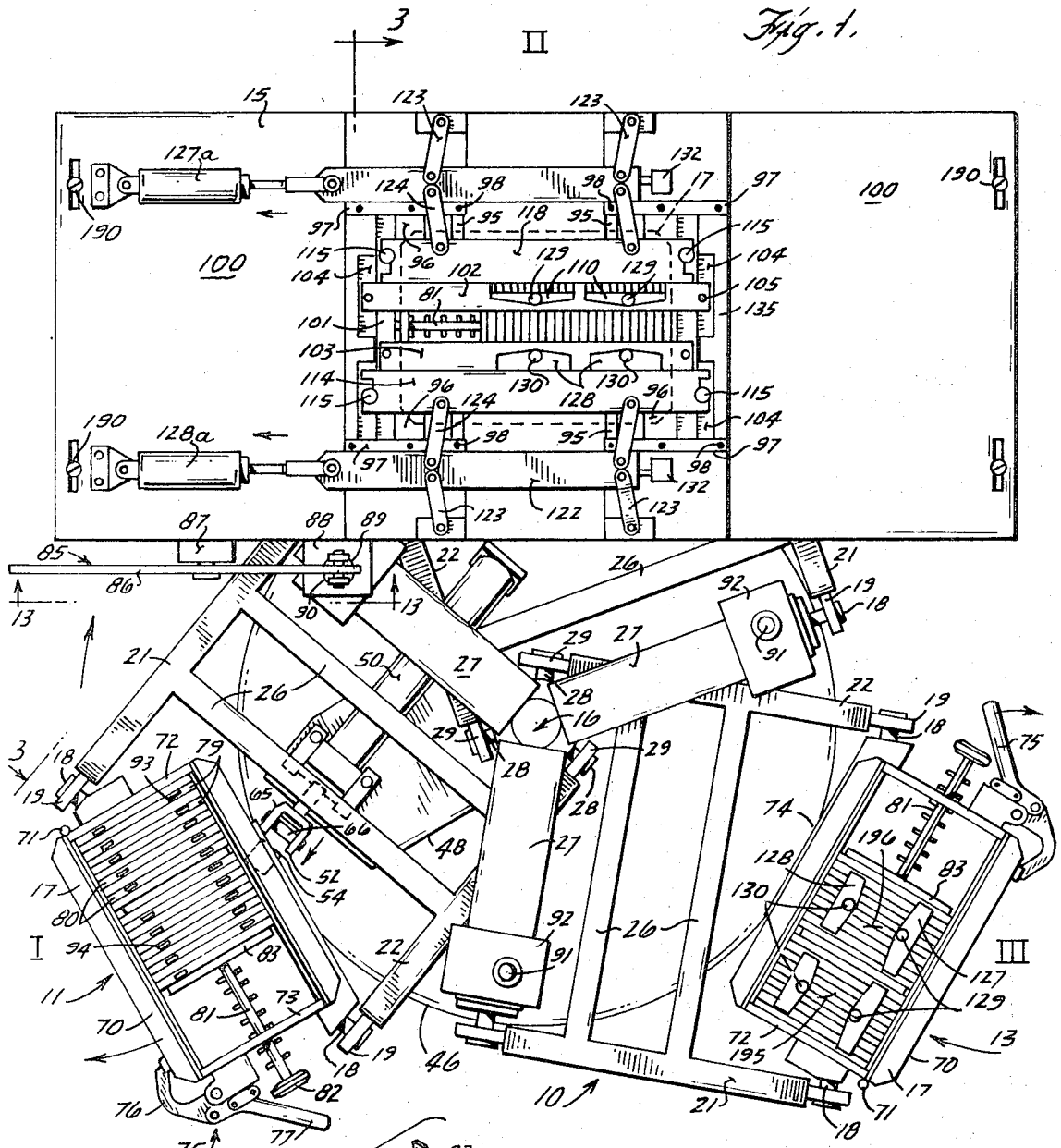
FIG. 1 is a top plan view of the three station assembly machine with the three separate stations being indicated by I, II, and III.

Proceeding to a detailed description of the present invention, the battery cell assembly machine 10 is comprised of three independent stations, each indicated by the numerals I, II, and III in FIG. 1. Numeral I indicates the position for a load station; II the position for a burning station and III an unloading station. It will be seen in FIG. 1 that each station is formed from a pivotally attached box assembly as indicated generally by the numbers 11, 12, and 13. It should be noted that with respect to box assembly 12 it will be obscured from view in FIG. 1 as it will be positioned beneath the forming station table 15 but it is shown in broken lines and would be viewed in FIG. 3. Each box assembly has a rectangular box which is the same and consequently will be indicated by the same numerals. The same is true regarding the attachment of the box assemblies to the central post assembly generally 16. Speaking specifically, of assembly 11 it includes a rectangular box 17 which is diagonally pivoted at the top and by means of two pins 18 which are secured in bearing arms 19 projecting from the ends of a pair of upper arms 21 and 22. Two pins 18 are also provided at the lower corners of box 17 and instead of being permanently held in a support arm such as 19 are temporarily held by means of an open slot 20 in lower arms 23 and 24 as shown in broken lines in FIG. 3. Upper arms 21 and 22 are linked laterally to lower arms 23 and 24 such as by bars 25. Suitable cross bracing is also provided between upper and lower arms 21 and 22 and 23 and 24 such as shown at 26. Item 27 provides the outboard support for arms 21 and 23. Upper arm 22 and another similar arm 24 which would be disposed below 22 and opposite to arm 23 would be directly attached to post assembly 16 such as by a pin 28 and a bearing arm 29. It will be seen that assembly box 11 is held in a vertical position because it is supported by a four bar linkage from the center column 16 in a raised or lowered position.

As best shown in FIG. 3, upper post 14 is rotatably disposed on post assembly generally 16 by means of thrust bearing assembly generally 32 having the usual ball race 33 and case 34. Support post 14 is interconnected to the large diameter section 35 of the ball race by means of support plate 36 to which is bolted by means of bolts 37, plate 38, secured to post 14. Thrust bearing assembly 32 is supported on a table support column 40 which also rotatably supports collar 41 to which is pivotally attached the lower support arms 23 and 24. Assembly 43 includes a thrust bearing and a standard split retainer ring to vertically support column 41. Table support column 40 is stabilized by angular support members 45 on a foot member 46. Also attached to table support column 40 but in a nonrotatable manner is a support plate 48 with a bracket 49 for adjustably positioning and attaching pneumatic piston 50 which has an extending piston rod 51 with an engagement end portion 52 for seating in bracket 54 beneath box assembly 11. Positioned in a vertical manner from the foot member 46 is a second air cylinder 55 supported by base assembly 56 with cylinder 55 having extending piston rod 58 with engagement end 59 for reciprocal engagement with a block 60 disposed beneath cross brace members such as shown at 26 and extending between adjacent arms 23 and 24. Also shown in FIG. 3 and positioned outwardly on support plate 36 from post 14, is an upwardly extending support post 62 for engagement with an upper cross bar member 26 and beneath it extending between adjacent arms 21 and 22 for purposes of supporting the box in its lower position.

As best seen in FIG. 1, the engagement portion 52 on air cylinder 50 is of the U-shaped type as indicated by the numeral 65 with a bolt 66 extending therethrough for engagement in the U-shaped slot 67 in block 54 beneath the box 17 to extend box 17 as shown in broken lines in FIG. 3. It will be seen that each box 17 has a front wall 70 which is hinged at 71 to sidewall 72. Wall 17 is securely held against opposing sidewall 73 by means of a self-locking clamp member generally 75 with the usual engaging jaw 76 and handle 77. Battery plates are shown by the numerals 79 and 80 and are held against wall 72 in box 17 by means of a rotatable pegged clamping member 81 which includes an end pressing plate 83 and an oppositely disposed knob member 82.

Attached alongside table 15 and in a pivotal manner is an indexing means generally 85 which includes a handle 86 pivotally attached to block 87 on table 15. A guide plate 88 is also secured at the side of table 15 and has an opening 89 for guiding a lower pin member 90 through the block 89 and into a corresponding aperture 91 in block 92 on cross arm 27, the aperture being located on arm 27 so that the pin 90 and the aperture coincide when a box assembly is positioned in a suitable manner under table 15.

Figure 2:
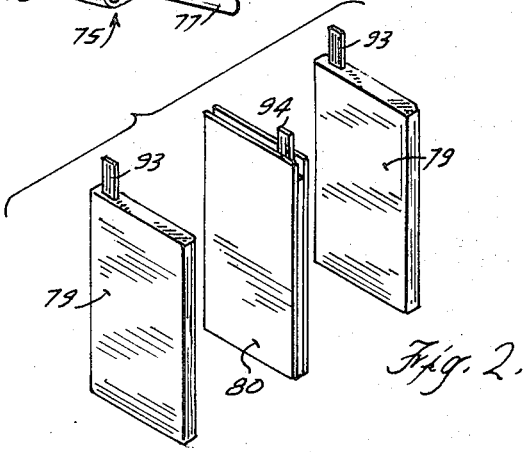
FIG. 2 is a perspective view showing some of the cell plates which are to be assembled in the machine shown in FIG. 1.

Shown in FIGS. 1 and 4–6 is the means to align and burn the straps from lugs such as shown at 93 and 94 in FIG. 2 for positive plates 79 and negative plate 80. Burning table 15 has a top plate portion 100 with a rectangular open section 101. In this open section two oppositely positioned dam bar members 102 and 103 are disposed with dam bar 102 secured to underlying slide bars 104 by means of screws 105 and similarly dam bar 103 is secured to slide bars 106. Each dam bar has open sections 108 and 109, respectively, with mold portions 110 and 111. It should be noted that slide bars 104 are interconnected to comb bar 114 by means of oppositely positioned lost motion pin members 115 and openings 116. Similarly, slide bars 106 connected to dam bars 103 are interconnected to comb bar 118 in a similar arrangement. A multiplicity of spaced comb members 120 extend from the respective comb bar members 114 and 118. Two transversly positioned bars 121 and 122 are pivotally linked to comb bars 118 and 114, respectively, by means of pivotal links 123 and 124 with pivotal link bars 123 being anchored to table 15 by block members 125. Bars 121 and 122 are actuated by hydraulic cylinders 127 and 128, respectively, and the usual U-shaped adjusting linkage 129 connects the piston rod 130 of each cylinder to the bars 121 and 122 as well as interconnecting the cylinders to the tabletop 100. Extended movement of each bar 121 and 122 is arrested by means of stopping members 132 which are positioned to engage the end of each bar when the bars are in a nearly extended position such as shown in FIG. 1. As stated earlier, FIG. 1 shows the burning station II and in this instance with the straps 127 and 128 formed with posts 129 and 130. This aspect will be explained during the operation of the machine.

As specifically shown in FIG. 5, anchoring supports 125 are positioned above the surface of table 100 by plates 135 supported by block numbers 136. The purpose for elevating the actuating bars 121 and 122 and the linkages is to utilize the upper surface of table 100 as a support for these bars as well as slide bars 104 and 106 shown in FIG. 4. As shown in FIG. 6, this permits the use of stabilizing sliding bars such as at 138 for comb bars 118 and 114 beneath plates 135 and on top of table 100. In order to guide bars 138 as well as bars 104 and 106 in a straight line, stationary bars 95 and 96 are secured to the table top 100 which is effected by crossbars 97 and screws 98 which is shown in FIG. 1.

One of the box assemblies 17 is shown in FIG. 7 in an assembly position and its adaptability to different plate sizes is seen by the fact that a bottom sliding floor member 150 is held in box assembly 11 by means of open slots 151 on opposing walls 72 and 73. Grooves are provided at 152 in the front wall 70 and the back wall 74. In the FIG. 7 view, the clamp member 75 is not shown but two of these clamps would be positioned on blocks 155 as shown on sidewall 73. As is the custom in the art, a multiplicity of negative plates 80 as well as alternating, positive plates 79 are placed together with the usual separators (not shown) in between the positive and the negative plates. A spacer 157 is provided between units of 195 and 196.

ALTERNATIVE EMBODIMENT

It should be recognized that different cell plates also require different sizes of cell lugs and thus some adjustment must be made in the size of the comb plate 114. This is best illustrated with reference to FIG. 8 and comparing it to the arrangement shown in FIG. 6. Similar parts are indicated by similar numbers except in the FIG. 8 alternative embodiment, the numbers are in the "200" series. It will be seen that a greater distance is afforded between a dam mold 111 and the adjacent end wall 214a of comb number 214. In order to fill in the opening created by the absence of wall 214 an L-shaped block 216 is utilized. This serves as a group spacer between the end of the dam mold 111 and wall 214a where no lug 80 would be positioned during the strap burning operation.

FIGS. 9 and 10 illustrate the lifting mechanism for removing the cell units 195 and 196 at the unloading station III. The lift unit generally 160 includes a multiplicity of oppositely disposed finger elements 161 and 162 which are spring loaded outwardly by means of spring 163. Each finger element has a lower L-shaped gripping member 165 and 166 respectively, which are oppositely disposed for sliding beneath the completed straps 128 and 127. Each row of finger elements such as 161 and 162 is supported in a pivotal manner by rods 167 and 168 disposed between end plates 169 and 170. Suitable annular adjustment type spacers 171 are provided along rods 167 for each finger element 161 and 162. Two parallel gripping rods 174 and 175 interconnect all of the rowed finger elements. A bracing bar 178 is placed on the top of end plates 169 and 170 and therebetween to interconnect hook engagement plates 180 and 181 which are engaged by a double pronged hook member 183. A hoist (not shown) will be utilized to lift cable 184. FIG. 9 shows the casing or jar 190 into which the two cell units as indicated by straps 127 are placed.

Although not shown in the drawings, suitable supporting frames would be provided to mount permanently burning table 15 at a height so that the assembly box 11 when at the load station I could be filled by an operator standing at floor level. At station II, which is the burning station, the operator would also be in a standing position with the table top 100 located approximately at waist height. Adjustment screws 190 provide the necessary attachment to a supporting structure and would also afford adjustment of the table between a forward and backward position to accommodate various sizes of plates such as shown at 79 and 80. The same supporting structure could also carry a hoist for cable 184 in an appropriate manner.

Figure 11:
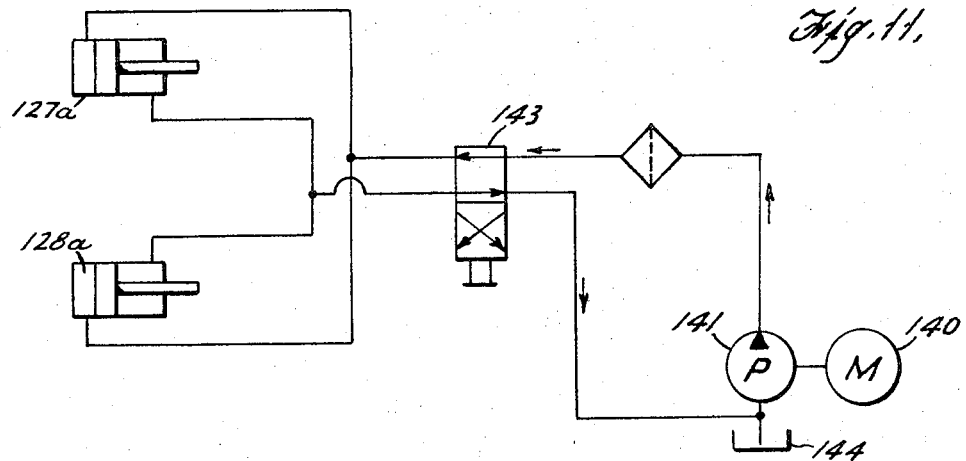
FIG. 11 is a schematic view of the hydraulic system utilized in the present machine.
Figure 12:
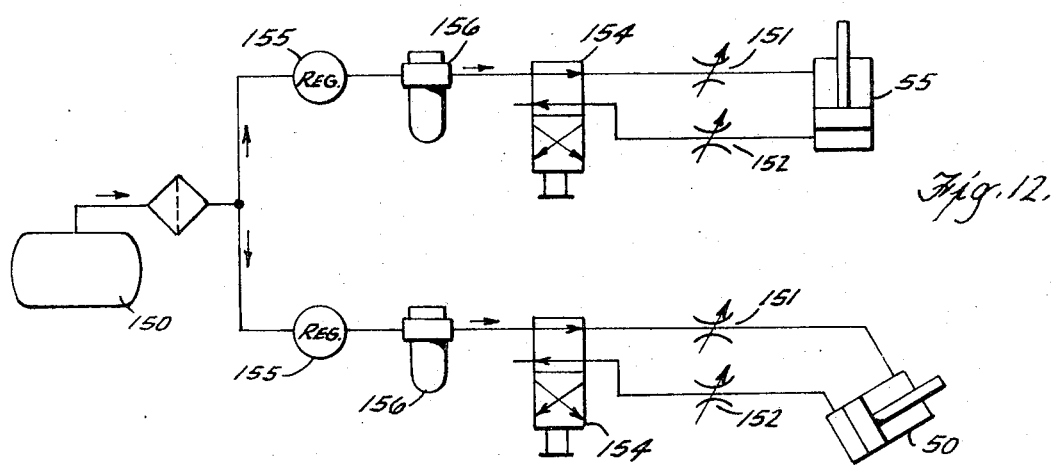
FIG. 12 is a view similar to FIG. 11 but showing the pneumatic system.
Figure 13:
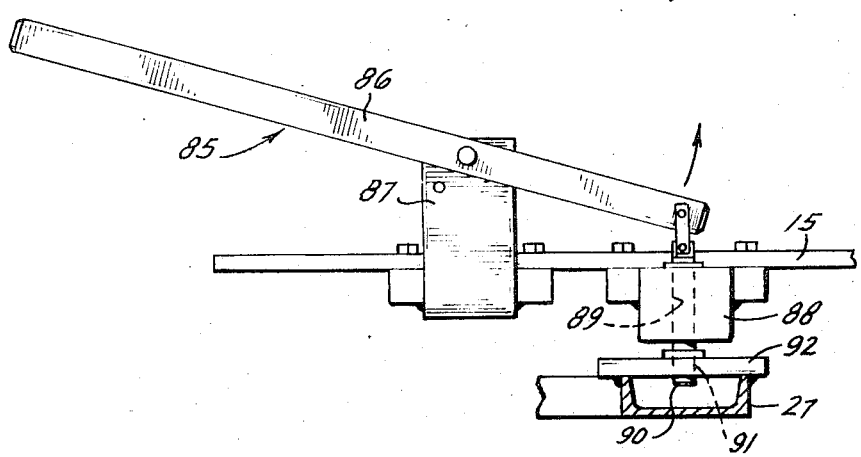
FIG. 13 is a sectional view of the indexing mechanism taken along line 13—13 of FIG. 1.

FIGS. 11 and 12 show the pneumatic and hydraulic systems for operating the pneumatic lifting mechanisms and the hydraulic actuation means, the latter being employed to move the comb bars 114 and 118 and dam bars toward each other. A motor 140 which is controlled by a double switch (not shown) connected in series for safety purposes drives a pump 141 which causes hydraulic fluid to flow to cylinders 127 and 128 in a reciprocal manner through a standard four-way, dual position valve 143. The usual fluid reservoir 144 hold the excess fluid from the evacuation side of the cylinders. The valve 143 as well as the double switches are preferably positioned on table top 100. Referring to the pneumatic systems for operating cylinders 50 and 55, a compressor 150 supplies the cylinders in a reciprocal manner by means of two pairs of flow controls 151 and 152 in connection with a four-way, two positioned valve 154. The usual regulator and lubricator 155 and 156 are also utilized. It should be understood that the valves and flow controls utilized in the pneumatic and hydraulic systems are only exemplary and any means for actuating the cylinders 50, 55, 127 and 128 could be utilized with the valve controls positioned in a convenient place.

OPERATION

A better umderstanding of the advantages of the three station industrial battery cell assembly machine 10 will be had by a description of its operation. Starting with loading station I the box assembly 11 would be positioned in an empty condition and level with the floor as shown in solid lines in FIG. 3. Pneumatic cylinder 50 would be actuated by means of valve 154 to extend piston rod 51 and engage end portion 52 of the rod for engagement with bracket 54 to extend box assembly 11 with the bottom portion tilted outwardly and the top backwardly. The front wall or door 70 will then be opened by releasing clamps 75 and the assembly box 11 filled with alternating negative and positive plates 79 and 80 as shown in FIG. 7. With the box in its outwardly tilted position and due to the fact that it is pivoted diagonally at the top, a compound angle effect is created whereby as the plates 79 and 80 are loaded into box assembly 11 they will gravitate to the left rear corner of the box thereby positively positioning them while more plates are placed therein until the desired number is attained. As stated earlier, the negative and positive plates will be alternately disposed in the box with a separator in between. All of the negative plates 80 will have their lugs aligned on one side and all the positive plates 79 with their lugs 93 oppositely aligned. When the desired number of cells is placed in the box for one cell unit a spacer such as 157 will be inserted and the operation repeated for the next set of plates to form another cell unit 196. With the desired units placed in box assembly 11, door 70 will be closed and clamped shut. Valve 154 will be actuated to retract piston rod 51 so as to allow box assembly 11 to resume its normal vertical position as shown in solid lines on the right hand side of FIG. 3. As all of the box assemblies 11, 12, and 13 are pivotally mounted on post 40, the operator will then manually exert a pushing force on the box or on one of the arms such as 22 to cause it to rotate so as to position box assembly 11 beneath table 15 the burning station II. Precise location beneath the table 15 and under opening 101 is afforded by the indexing mechanism 85 which is correlated on the frame arm 27 so that it engages opening 91 at the precise point when the box assembly, which would now be assembly 12 is located beneath table 15. At station II, valve 154 for pneumatic cylinder 55 would be actuated which will cause piston rod 58 to extend upwardly and engage block 60 thereby causing assembly box 12 to be elevated in a vertical position to the proper burning height. After this is effected, valve 143 would be actuated to allow fluid to flow to hydraulic cylinders 127 and 128 and the motor 140 actuated by a double switch. This will cause slide bars 121 and 122 to move from left to right as viewed in FIGS. 1 and 4 thereby causing comb bars 114 and 118 to move toward each other and actuate dam bars 102 and 103. The lugs 93 and 94 will be positioned between comb members 120 and held against the dam bars. An operator with a suitable gas torch will then proceed to melt all of the lugs as well as insert posts 130 and 129. Additional lead will be added so as to fill the opening in the dam openings 110 and 111 to a predetermined level. Alternatively, molten lead can be introduced to join the lugs and form straps. After allowing the lead to solidify, the operator at the burning station will move valve 143 to a position opposite to that previously so as to cause hydraulic cylinders 127 and 128 to retract slide bars 121 and 122. This will cause comb bars 114 and 118 to move away from each other and cause the dam bars 102 and 103 to retract. It will be noted particularly in FIG. 4 that comb bar 114 through pin member 115 and lost motion opening 116 controls the movement of dam bar 102 and in a like manner comb bar 108 controls the movement of dam bar 103 in opposing directions through slide bars 104 and 106, respectively. This facilitates the positioning and retraction of the comb members 114 and 120 and dam bars 102 and 103. With the straps 127 and 128 and corresponding posts 129 and 130 formed as shown in FIG. 1, control valve 154 will be moved so as to allow piston rod 58 of pneumatic cylinder 55 to retract thereby permitting box assembly 12 to drop to a lowered position. In this ragard it should be noted that at the various stations, support posts 62 are provided to engage upper bracing between arms 21 and 22 to stabilize the assembly boxes in a lowered position. All of the assembly boxes 11, 12, and 13 are again rotated to their next position which means that assembly 12 will now become assembly 13 as shown at station number III. At this point, the lifting mechanism 160 will be lowered by means of a hoist (not shown) and finger elements 161 and 162 compressed toward each other by an operator gripping bars 174 and 175. Load rest members 165 and 166 will then be positioned beneath straps 127 and 128 and released to engage the undersides of the straps. The hoist is then moved to a lifting position so as to lift the burned cell units 195 and 196 out of box assembly 13 and then to lower them into a typical battery jar 190. Subsequently, the usual top cover panel will be assembled on the jar 190 and the cell is then completed and ready for filling and charging.

It will be seen in the previous description that throughout many of the operations whether it be assembly at stage I, the burning at stage II, or the unloading at stage III, an operator is simultaneously performing an operation at each particular station. This results in a most efficient arrangement of work stations and fastest production rates.

Not only does the battery assembly machine 10 have a high production rate, it also is very versatile in that the box assemblies 11, 12, or 13 can accept cell plates of various sizes and lugs with various dimensions. Similarly, a multiple of plates can be used to form cell units and various numbers of cell units with various numbers of cell plates can be accommodated in a single box assembly. To accommodate the various sizes of lugs or numbers of them at the loading station, different dam bars such as 102 and 103 and/or comb bars such as 214 can be easily substituted. Also, the table adjustment as shown by screws 190 is easily made. Further, cell units 195 and 196 can be dropped through box 13 by removal of floor 150 instead of being lifted out.

It will thus be seen that through the present invention there is now provided a multistationed battery assembly machine which results in a high production rate for battery cell units. The battery assembly machine is easily adapted to receiving cell units and lugs of various sizes and dimensions. No special tooling or parts are required for fabricating the machine yet it can be operated without any special instruction or hazard to the operators. Positive initial assembly of the cells is afforded by a unique assembly box arrangement which also reduces assembly time. Further, by utilizing a circular pattern for the three positions, a minimum amount of floor space is required yet the burning machine can be easily accommodated in any factory without major alterations or capital investment.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A multistationed burning machine for assembling cell units for a battery comprising: at least three carrier assemblies adapted to receive and retain plates with upstanding lugs in a predetermined position, means defining three independent load, burning and unloading stations, means to rotate and position said carrier assemblies at and through each said load, burning and unloading stations, said burning station including means to align and partially enclose said lugs to facilitate the burning of said lugs into straps with a post element and said unloading station including means to remove said plates with said straps, said means to rotate and position said carrier assemblies through said load, burning and unloading stations effecting rotation substantially along a horizontal plane, and means to pivot each said assembly when positioned at said load station and retain each said assembly at an angle from said horizontal plane.

2. The multistationed burning machine as defined in claim 1 wherein said carrier assemblies comprise multipositioned box assemblies.

3. The multistationed burning machine as defined in claim 2 wherein said box assemblies are pivotally mounted on said rotation means and at opposing corners of said box assemblies.

4. The multistationed burning machine as defined in claim 3 including means to pivot the box assemblies, upwardly at a compound angle to facilitate the loading thereof.

5. The multistationed burning machine as defined in claim 4 further including means to lift said box assemblies upwardly to facilitate the alignment of said lugs for burning into said straps.

6. The multistationed burning machine as defined in claim 2 wherein said multipositioned box assemblies comprise adjustable sidewalls and bottom walls.

7. The multistationed burning machine as defined in claim 1 wherein said carrier assemblies include an assembly box and said means to support and raise each said assembly box includes pivoting means comprising two pairs of pivotal arms engaging the top and bottom of each assembly box to form a four-bar linkage causing each said assembly box to remain vertical while being raised.

8. The multistationed burning machine as defined in claim 1 wherein said unloading station further includes a multiplicity of oppositely disposed finger elements for engagement beneath the burned straps to facilitate the lifting of each formed cell unit.

9. The multistationed burning machine as defined in claim 1 wherein said burning station further includes indexing means to position and hold each said assembly during a burning operation.

10. The multistationed burning machine as defined in claim 1 wherein said means to align and partially enclose said lugs includes oppositely disposed dam and comb members for aligning said lugs and oppositely disposed slide bar members with linkage to align and position said lugs in said dams.

11. The multistationed burning machine as defined in claim 7 wherein said pivoting means includes a lifting mechanism to move said assembly box away from the bottom pair of pivotal arms.

* * * * *

UNITED STATES PATENT OFFICE
CERTIFICATE OF CORRECTION

Patent No. 3,813,024　　　　　　　　Dated May 28, 1974

Inventor(s) Walter Carl Kirchberger

It is certified that error appears in the above-identified patent and that said Letters Patent are hereby corrected as shown below:

Column 1, line 47, "batter" should be --battery--.

Column 3, line 25, "column" should be --collar--.

Column 3, line 53, "17" should be --70--.

Column 4, line 26, "127 and 128" should be --127a and 128a--.

Column 4, line 42, "numbers" should be --members--.

Column 5, line 12, "number" should be --member--.

Column 5, line 13, "214" should be --214a--.

Column 5, line 16, "80" should be --94--.

Column 6, lines 8 & 9, "127 and 128" should be --127a and 128a--.

Column 6, line 62, "127 and 128" should be --127a and 128a--.

Column 7, line 10, "127 and 128" should be --127a and 128a--.

Column 7, line 17, "108" should be --118--.

Column 8, line 2, "easily" should be --readily--.

Signed and sealed this 29th day of October 1974.

(SEAL)
Attest:

McCOY M. GIBSON JR.
Attesting Officer

C. MARSHALL DANN
Commissioner of Patents